(12) United States Patent
Hay et al.

(10) Patent No.: US 8,517,319 B2
(45) Date of Patent: Aug. 27, 2013

(54) APPARATUS FOR MOUNTING FOR MULTIPLE LASERS

(75) Inventors: William C. Hay, Heppenheim (DE); Ingo Böhm, Heidelberg (DE); Andreas Gorshöfer, Nittenau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1371 days.

(21) Appl. No.: 11/610,120

(22) Filed: Dec. 13, 2006

(65) Prior Publication Data
US 2007/0146874 A1  Jun. 28, 2007

(30) Foreign Application Priority Data
Dec. 14, 2005 (DE) .......................... 10 2005 059 649

(51) Int. Cl.
*F16M 11/00* (2006.01)
*G02B 21/00* (2006.01)
(52) U.S. Cl.
USPC ........................................ 248/200; 359/390
(58) Field of Classification Search
USPC ............. 248/440.1, 163.1, 200, 200.1, 316.8, 248/544, 558, 346.01; 359/390; 372/36, 372/98–108; 33/276, 281, 286, 290, DIG. 21; 353/119; 108/50.02, 57.1
See application file for complete search history.

(56) References Cited

U.S. PATENT DOCUMENTS

| | | | | |
|---|---|---|---|---|
| 3,684,381 A | * | 8/1972 | Zoot | ............................. 356/138 |
| 3,709,166 A | * | 1/1973 | Bush | ............................. 108/106 |
| 3,771,466 A | * | 11/1973 | Ferdinand et al. | ............ 108/109 |
| 3,835,414 A | * | 9/1974 | Ahearn | ....................... 372/50.12 |
| 3,914,013 A | | 10/1975 | Rosenberg | |
| 3,941,567 A | * | 3/1976 | Combaz | .......................... 422/80 |
| 4,562,521 A | * | 12/1985 | Noguchi | ....................... 362/433 |
| 4,825,034 A | | 4/1989 | Auvert et al. | |
| 5,239,621 A | * | 8/1993 | Brown et al. | ................ 358/1.16 |
| 5,490,603 A | * | 2/1996 | Davis | .......................... 220/4.12 |
| 5,533,456 A | * | 7/1996 | Regina | ....................... 108/57.29 |
| 5,746,405 A | * | 5/1998 | Dvorak et al. | ................ 248/146 |
| 6,205,160 B1 | * | 3/2001 | Grewell | .......................... 372/36 |
| 6,725,551 B1 | * | 4/2004 | Sutton | ............................. 33/286 |
| 7,059,575 B2 | * | 6/2006 | Garton | ..................... 248/346.01 |
| 7,316,378 B1 | * | 1/2008 | Curran et al. | .............. 248/298.1 |

(Continued)

FOREIGN PATENT DOCUMENTS

| | | |
|---|---|---|
| DE | 196 49 605 A1 | 6/1998 |
| DE | 103 61 177 A1 | 7/2005 |

*Primary Examiner* — Terrell McKinnon
*Assistant Examiner* — Ingrid M Weinhold
(74) *Attorney, Agent, or Firm* — Foley & Lardner LLP

(57) ABSTRACT

An apparatus for mounting multiple lasers, including a mounting plate configured to receive multiple lasers and including a first side and a second side, wherein the first side and the second side are not coplanar; at least six leg portions, each including a support end; wherein at least three of the leg portions project away from the first side of the mounting plate and at least three of the leg portions project away from the second side of the mounting plate; and wherein the support ends of the leg portions projecting away from the first side are configured to support the mounting plate when the first side is facing in a generally downward direction, and the support ends of the leg portions projecting away from the second side are configured to support the mounting plate when the second side is facing in a generally downward direction.

15 Claims, 5 Drawing Sheets

(56) References Cited

U.S. PATENT DOCUMENTS

| | | | |
|---|---|---|---|
| 2002/0008790 A1* | 1/2002 | Tajima | 349/2 |
| 2002/0121610 A1 | 9/2002 | Tewes et al. | |
| 2004/0163265 A1* | 8/2004 | Helms | 33/286 |
| 2004/0177523 A1* | 9/2004 | Chang et al. | 33/281 |
| 2005/0198845 A1* | 9/2005 | Robinson | 33/227 |

* cited by examiner

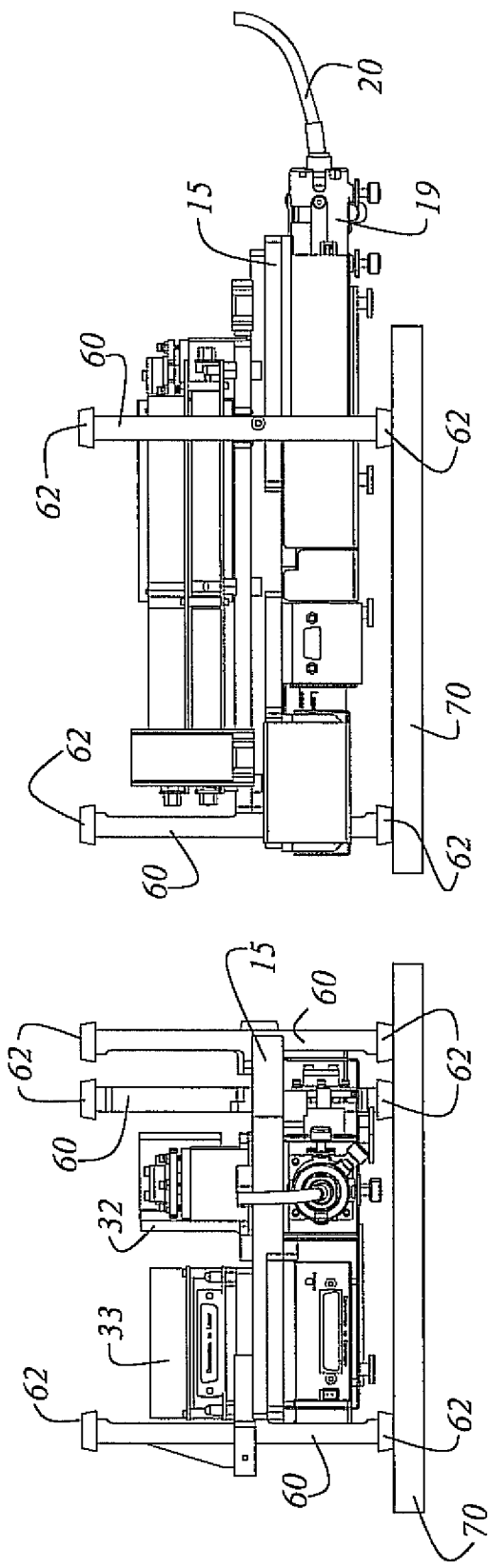

APPARATUS FOR MOUNTING FOR MULTIPLE LASERS

CROSS-REFERENCE TO RELATED PATENT APPLICATIONS

The right of foreign priority is claimed under 35 U.S.C. §119(a) based on Federal Republic of Germany Application No. 10 2005 059 649.5, filed Dec. 14, 2005, the entire contents of which, including the specification, drawings, claims and abstract, are incorporated herein by reference.

BACKGROUND OF THE INVENTION

The invention relates to an apparatus for mounting for multiple lasers.

German Unexamined Application DE 196 49 605 A1 discloses a fluorescence correlation spectroscopy module for a microscope. The module is affixed on the microscope with a flange connection. The light deriving from a laser can be coupled into the module via a flange connection, with an optical waveguide. The document does not disclose how service-friendly maintenance of the module is to be carried out.

SUMMARY OF THE INVENTION

It is an object of the invention to create a simple, service-friendly apparatus for coupling various types of lasers into a microscope. The apparatus is incorporated into an extra housing.

The object is achieved by an apparatus that encompasses the features of claim 1.

The invention has the advantage that at least three legs, which space the multiple lasers away from a support, are mounted on a mounting plate.

The mounting plate is embodied with an upper side and a lower side, the upper side carrying at least one laser and one electronic unit, and the lower side carrying at least one further laser and one electronic unit, the legs being mounted in such a way that both the upper side and the lower side can face away from the support.

It is advantageous if the apparatus for mounting for multiple lasers is equipped with a light-guiding fiber that transports the light of the multiple lasers from the mounting plate to an optical system. The mounting plate itself possesses a combining unit that comprises multiple input ports. Each laser likewise comprises an output port for light. The lasers are mounted or arranged on the mounting plate in such a way that the respective output of a laser is colinear with the pertinent input port of the combining unit. The combining unit combines the light of the multiple lasers into a single beam.

The combining unit is further embodied with an output port that is in operative correlation with an incoupling element of the light-guiding fiber. The combining unit furthermore possesses at least two input ports for the light of the lasers.

The mounting plate for the lasers and the combining unit possesses an upper side and a lower side. The upper side carries the combining unit and the multiple lasers. The lower side carries at least one further laser and electronic components that are necessary for controlling and operating the lasers on the mounting plate.

The light of the at least one further laser that is provided on the lower side of the mounting plate is guided via a deflecting system to the incoupling element of the light-guiding fiber, and is likewise colinear with the light of the combining unit.

The lasers are mounted on the mounting plate with an adapter plate.

The adapter plate is embodied for each laser in such a way that upon mounting of the laser, together with the adapter plate, on the mounting plate, the output of the respective laser is colinear with the respective input port of the combining unit.

Embodied in the mounting plate, for each adapter plate, is a milled recess in which the unit made up of laser and adapter plate is then mounted. The milled recess in the mounting plate is larger in length and width than the length and width of the adapter plate, so that an alignment of the output of the laser with respect to the associated input of the combining unit is enabled, or form an accurately fitted stop for the adapter plate.

The mounting plate is enclosed, together with the lasers, by a housing. The light-guiding fiber guides the light of the combined lasers to the optical system.

The optical system can be a laser scanning microscope or a wide-field microscope.

Further advantageous embodiments of the invention are evident from the dependent claims.

Further objects, features and advantages of the present invention will become apparent from the detailed description of preferred embodiments that follows, when considered together with the accompanying figures of drawing.

BRIEF DESCRIPTION OF THE DRAWINGS

The subject matter of the invention is depicted schematically in the drawings and will be described below with reference to the Figures, in which:

FIG. 5 is a side view of the mounting plate looking in direction A, the plate being placed on a supporting element for service purposes;

FIG. 6 is a side view of the mounting plate looking in direction B, the plate being placed on a support element for service purposes.

DETAILED DESCRIPTION OF THE PREFERRED EMBODIMENTS

Figure 1:
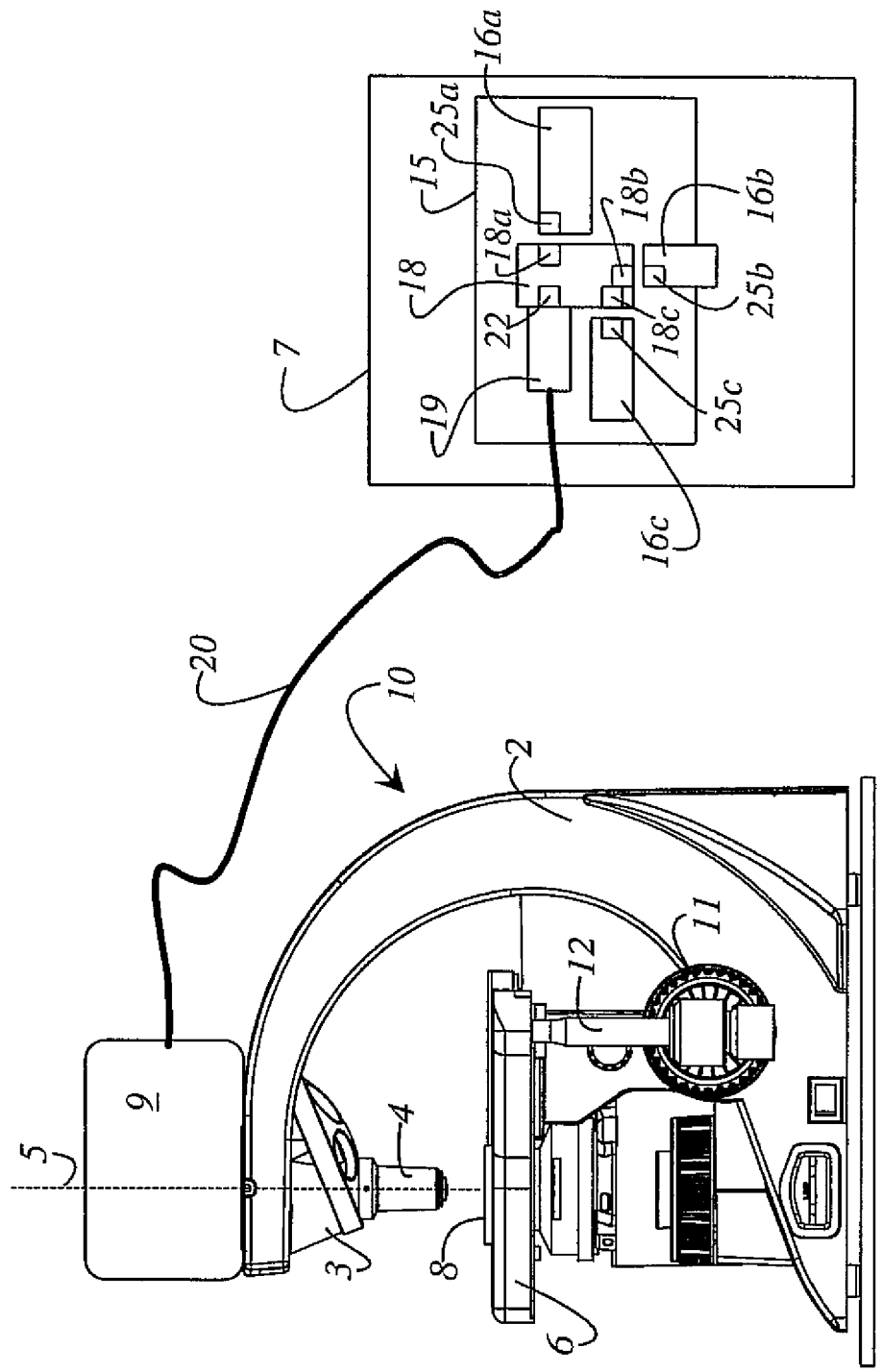
FIG. 1 schematically depicts an optical system and a mounting plate, provided in a housing, for multiple lasers, the laser light being transported from the mounting plate to the optical system using a light-guiding fiber.

FIG. 1 shows an optical system 10, associated with which is a housing 7 from which a light-guiding fiber 20 leads to the optical system. Optical system 10 is in this case a microscope that is equipped with a scanning unit 9. Optical system 10 encompasses a microscope stand 2 and a revolving nosepiece 3, affixed on microscope stand 2, that carries at least one objective 4. Objective 4 can be pivoted, by way of the nosepiece, into a working position. Also provided on microscope stand 2 is a microscope stage 6 on which a specimen 8 to be examined can be placed. Microscope stage 6 can be displaced, by means of an apparatus for microscope stage displacement and focusing of specimen 8, parallel to optical axis 5 of objective 4. The parallel displacement of microscope stage 6 is accomplished by way of at least one operating element 11 provided on the stand, or automatically e.g. by way of stepping motors. Affixed on microscope stage 6 is a further displacement element 12 with which a displacement of microscope stage 6 perpendicular to optical axis 5 is accomplished. Provided in housing 7, inter alia, is a mounting plate 15. From mounting plate 15, light-guiding fiber 20 leads to optical system 10. At least two lasers 16a, 16b, 16c, whose light is coupled into a combining unit 18, are arranged on the mounting plate. Combining unit 18 is connected to an incoupling element 19 of light-guiding fiber 20, so that the light from lasers 16a, 16b, 16c combined in combining unit 18 can be coupled into light-guiding fiber 20.

Figure 2:
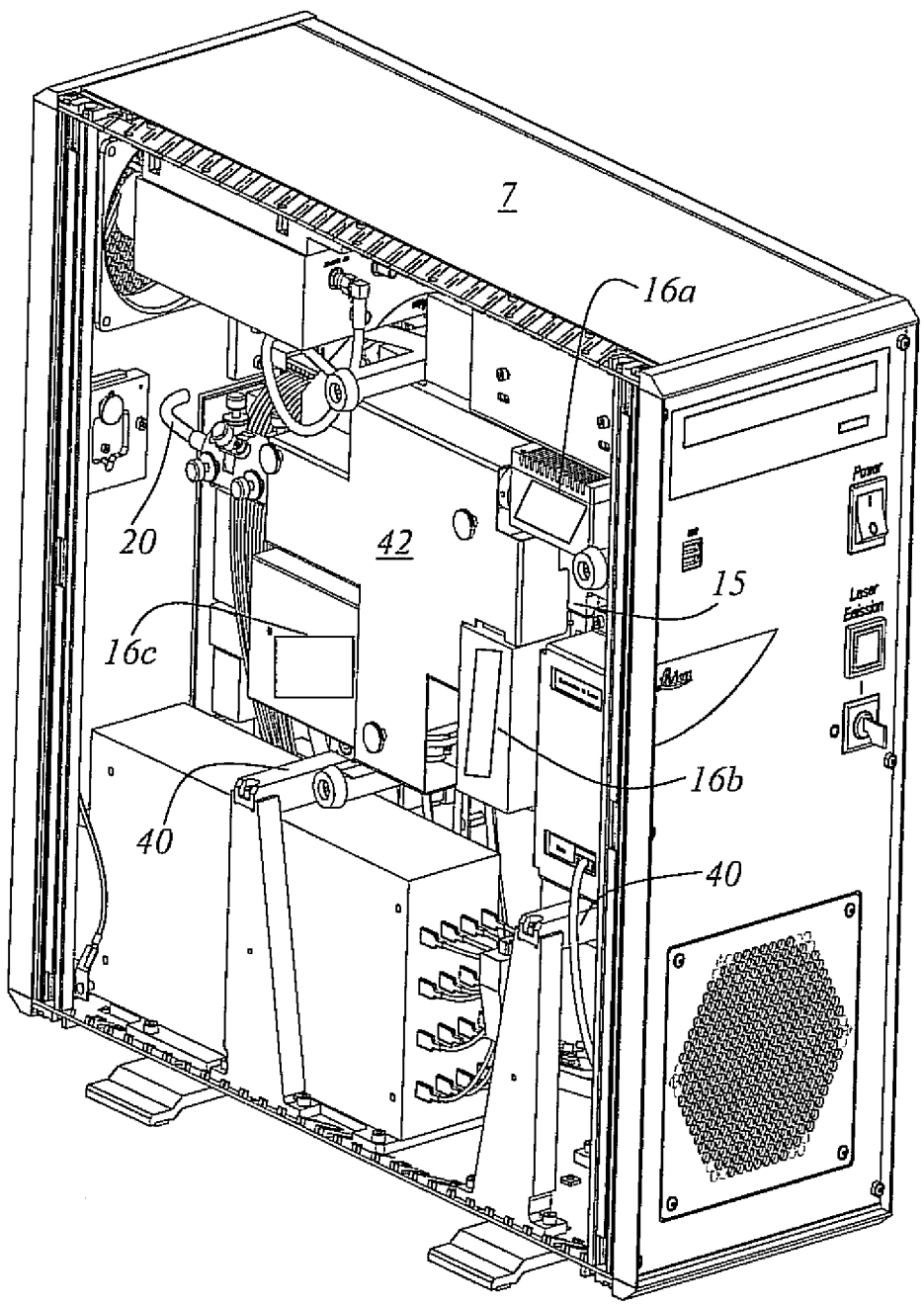
FIG. 2 is a perspective view of the housing in which the mounting plate having the multiple lasers is accommodated.

FIG. 2 is a perspective view of housing 7 in which mounting plate 15, having the multiple lasers 16a, 16b, 16c, is accommodated. Housing 7 is similar to the housing for a desktop computer. Mounting plate 15 further encompasses multiple holding elements 40 with which the mounting plate is affixed in housing 7. From mounting plate 15, the light of the combined lasers 16a, 16b, 16c is directed via light-guiding fiber 20 out of the housing to optical system 10. Combining unit 18, provided on mounting plate 15, is equipped with a cover 42.

Figure 3:
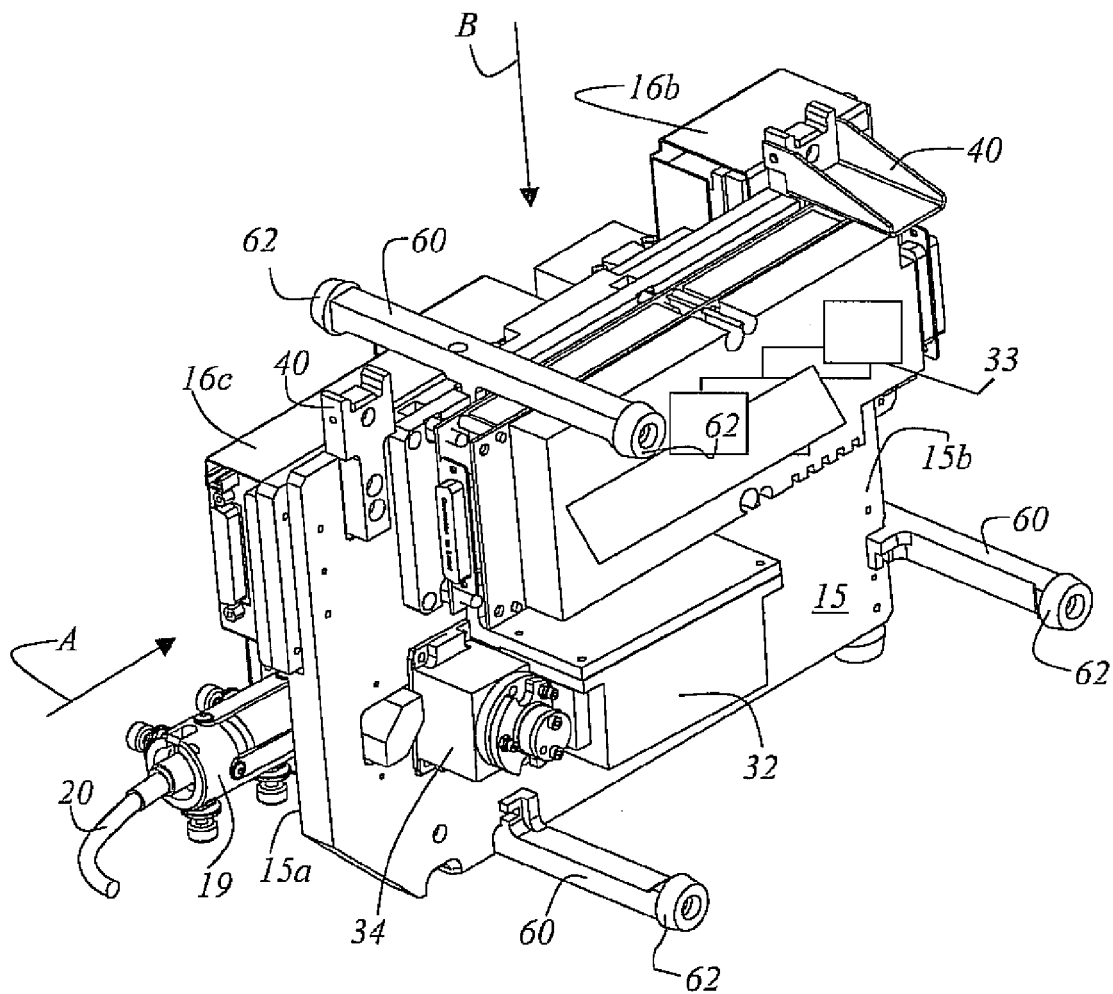
FIG. 3 is a perspective view of the mounting plate.

FIG. 3 is a perspective view of mounting plate 15 with the components and constituents attached on it and to it. Lower side 15b of mounting plate 15 is more visible in this depiction. Multiple lasers 16a, 16b, 16c are likewise arranged on upper side 15a of mounting plate 15. Combining unit 18 possesses an output port 22 out of which the combined light beam of lasers 16a, 16b, 16c is transferred into incoupling element 19 of light-guiding fiber 20. First laser 16a, second laser 16b, and third laser 16c are mounted on mounting plate 15 in such a way that output 25a of first laser 16a is colinear with input port 18a of combining element 18, output port 25b of second laser 16b is likewise colinear with input port 18b of combining element 18, and output 25c of third laser 16c is colinear with input port 18c of combining element 18. Lower side 15b of mounting plate 15 carries a further laser 32. The light of further laser 32 is guided via a deflection system 34 to incoupling element 19 on upper side 15a of mounting plate 15. Also mounted on lower side 15b of mounting plate 15 is an electronic unit 33 that is provided for control and regulation of the various lasers 16a, 16b, 16c, 32 joined to mounting plate 15. Multiple legs 60 are affixed on mounting plate 15. In the embodiment depicted here, three legs 60 are affixed on mounting plate 15. It is known that a tripod always results in a solid footing regardless of the configuration of the substrate. In order to improve the footing, feet 62 manufactured from a non-slip material are attached to the respective ends of legs 60. Mounting plate 15 can thus be set up securely, outside the housing, on a substrate or support 70 (see FIG. 5 or 6). A service person can thereby easily get at the individual components of mounting plate 15, and perform any necessary service or replacement of components.

Figure 4:
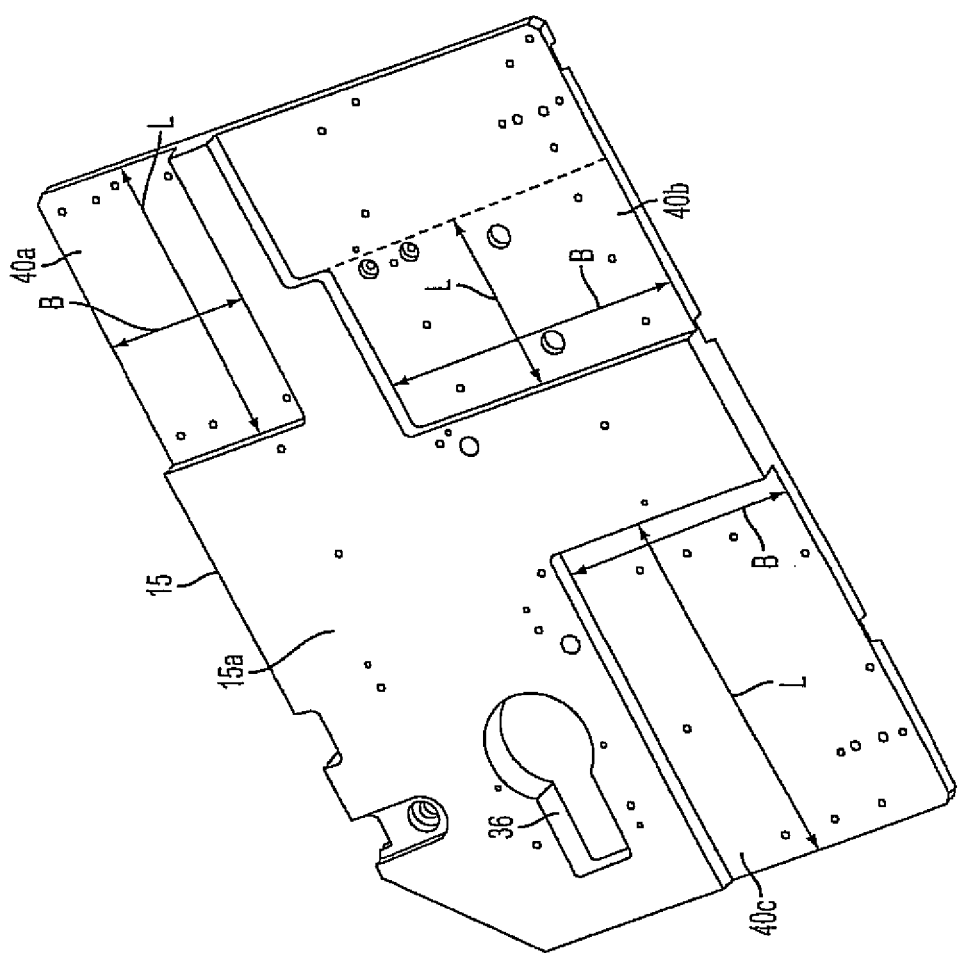
FIG. 4 is a plan view of the upper side of the mounting plate.

FIG. 4 is a plan view of upper side 15a of mounting plate 15, all the elements that can be arranged on the mounting plate, for example lasers and/or electronic units, having been removed so as thereby to allow a better view of the configuration of mounting plate 15. Mounting plate 15 comprises multiple recesses 40a, 40b, 40c into which a laser, together with an adapter plate (not depicted), can be placed. Each of the milled recesses 40a, 40b, 40c shaped into mounting plate 15 has a respective length L and width B. The length L and width B of milled recesses 40a, 40b, 40c are dimensioned in such a way that they are larger than the dimensions, in terms of length and width, of an adapter plate (not depicted) for the respective laser. The fact that milled recesses 40a, 40b, 40c are larger than the adapter plates associated with the respective lasers has the advantage that when the respective laser is mounted on mounting plate 15, there is a certain clearance for alignment of the output of the respective laser with the input port of combining unit 18. Also possible, however, is the mounting of already preadjusted optical assemblies on a stop of the milled recess, so that laborious alignment can be omitted.

FIG. 5 is a side view of mounting plate 15 looking in direction A in FIG. 2, said plate being set on a support 70 for service purposes. FIG. 6 is a side view of mounting plate 15 looking in direction B, said plate being set on support 70 for service purposes. In the depictions of FIGS. 5 and 6, mounting plate 15 having the various components is set on support 70 in such a way that lower side 15b of mounting plate 15 faces away from support 70. Support 70 can be embodied as a conventional desk or as a console, on which a service person carries out the necessary service on the elements affixed on mounting plate 15. Laser 32 and electronics unit 33 on lower side 15b of mounting plate would thus be accessible for service. The situation is similar when mounting plate 15 is set on support 70 having been rotated 180°, the components on upper side 15a of mounting plate 15 then being accessible. As is evident from FIG. 5 and FIG. 6, mounting plate 15 is carried by at least three legs 60 when mounting plate 15 rests on support 70. The at least three legs 60 are mounted on mounting plate 15 in such a way that the multiple lasers 16a, 16b, 16c, 32, and the at least one electronic unit 33, are spaced away from a support. Legs 60 are mounted on mounting plate 15 in such a way that upper side 15a and lower side 15b of mounting plate 15 are parallel to support 70. Each of legs 60 is equipped, at the same respective end, with a foot 62. In the embodiment depicted here, legs 60 each have an oppositely located end. Each end is equipped with a foot 62. Feet 62 are manufactured from a non-slip material. As a rule, the material of the feet is an elastomer. Because of the solid footing of mounting plate 15 on support 70, the service person can carry out the necessary service conveniently and safely. Service in the interior of housing 7 would be extremely awkward, and would require a large expenditure of time. In addition, the solid footing of mounting plate 15 on support 70 facilitates installation of the various components on mounting plate 15, and possible damage or misalignment of components during installation is avoided.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. An apparatus for mounting multiple lasers, comprising:
    a mounting plate including a first side and a second side, the mounting plate including at least one laser on each of the first side and the second side, wherein the first side and the second side are not coplanar;
    at least six leg portions, each including a support end; and
    a unit configured to couple laser light from the lasers to a light-guiding fiber of a microscope;
    wherein at least three of the leg portions project away from the first side of the mounting plate and at least three of the leg portions project away from the second side of the mounting plate; and wherein the support ends of the leg portions projecting away from the first side are configured to support the mounting plate when the first side is facing in a generally downward direction, and the support ends of the leg portions projecting away from the second side are configured to support the mounting plate when the second side is facing in a generally downward direction.

2. The apparatus according to claim 1, wherein an electronic unit is mounted to the mounting plate.

3. The apparatus according to claim 1, wherein the support ends of the leg portions projecting away from at least one of the first side or the second side of the mounting plate are each equipped with a foot.

4. The apparatus according to claim 3, wherein the feet are manufactured from a non-slip material.

5. The apparatus according to claim 1, wherein the support ends of the at least six leg portions are each equipped with a foot.

6. The apparatus according to claim 5, wherein the feet are manufactured from a non-slip material.

7. The apparatus according to claim 1, wherein the at least three leg portions projecting away from the first side of the mounting plate are continuous and coaxial with the at least three leg portions projecting away from the second side of the mounting plate.

8. The apparatus according to claim 1, further comprising multiple holding elements configured to affix the mounting plate to a housing.

9. The apparatus according to claim 1, wherein the mounting plate includes recesses configured to hold a laser.

10. The apparatus according to claim 1, wherein the at least six leg portions further include an attachment end; and
wherein the attachment ends of at least three of the leg portions are attached to the first side of the mounting plate and the attachment ends of at least three of the leg portions are attached to the second side of the mounting plate.

11. An apparatus for mounting multiple lasers, comprising:
a mounting plate configured to receive multiple lasers and including a first side and a second side, wherein the first side and the second side are not coplanar;
at least six leg portions, each including a support end;
wherein at least three of the leg portions project away from the first side of the mounting plate and at least three of the leg portions project away from the second side of the mounting plate;
wherein the support ends of the leg portions projecting away from the first side are configured to support the mounting plate when the first side is facing in a generally downward direction, and the support ends of the leg portions projecting away from the second side are configured to support the mounting plate when the second side is facing in a generally downward direction;
wherein a laser and an electronic unit are mounted to the first side of the mounting plate;
wherein a laser and an electronic unit are mounted to the second side of the mounting plate; and
a unit configured to couple laser light from said lasers to a light-guiding fiber of a microscope;
wherein the support ends of the leg portions projecting away from the first side protrude farther from the mounting plate than the laser and the electronic unit mounted to the first side, and the support ends of the leg portions projecting away from the second side protrude farther from the mounting plate than the laser and the electronic unit mounted to the second side.

12. The apparatus according to claim 11, further comprising a support;
wherein the support is separated from the laser and the electronic unit mounted to the first side of the mounting plate by the leg portions projecting away from the first side of the mounting plate; and
wherein the support is generally parallel to the first side of the mounting plate.

13. The apparatus according to claim 11, further comprising a support;
wherein the support is separated from the laser and the electronic unit mounted to the second side of the mounting plate by the leg portions projecting away from the second side of the mounting plate; and
wherein the support is generally parallel to the second side of the mounting plate.

14. A system comprising:
a microscope;
an apparatus for mounting multiple lasers, comprising:
a mounting plate including a first side and a second side, the mounting plate including at least one laser on each of the first side and the second side, wherein the first side and the second side are not coplanar;
at least six leg portions, each including a support end; and
a unit configured to couple laser light from the lasers to a light-guiding fiber of a microscope;
wherein at least three of the leg portions project away from the first side of the mounting plate and at least three of the leg portions project away from the second side of the mounting plate; and
wherein the support ends of the leg portions projecting away from the first side are configured to support the mounting plate when the first side is facing in a generally downward direction, and the support ends of the leg portions projecting away from the second side are configured to support the mounting plate when the second side is facing in a generally downward direction; and
a light-guiding fiber coupling the microscope and the apparatus.

15. An apparatus for mounting multiple lasers, comprising:
a mounting plate including a first side and a second side, the mounting plate including at least one laser on each of the first side and the second side, wherein the first side and the second side are not coplanar;
at least six leg portions, each including a support end; and
a combining unit configured to combine light from at least two of said lasers;
wherein at least three of the leg portions project away from the first side of the mounting plate and at least three of the leg portions project away from the second side of the mounting plate; and
wherein the support ends of the leg portions projecting away from the first side are configured to support the mounting plate when the first side is facing in a generally downward direction, and the support ends of the leg portions projecting away from the second side are configured to support the mounting plate when the second side is facing in a generally downward direction.

* * * * *